Figure 1:
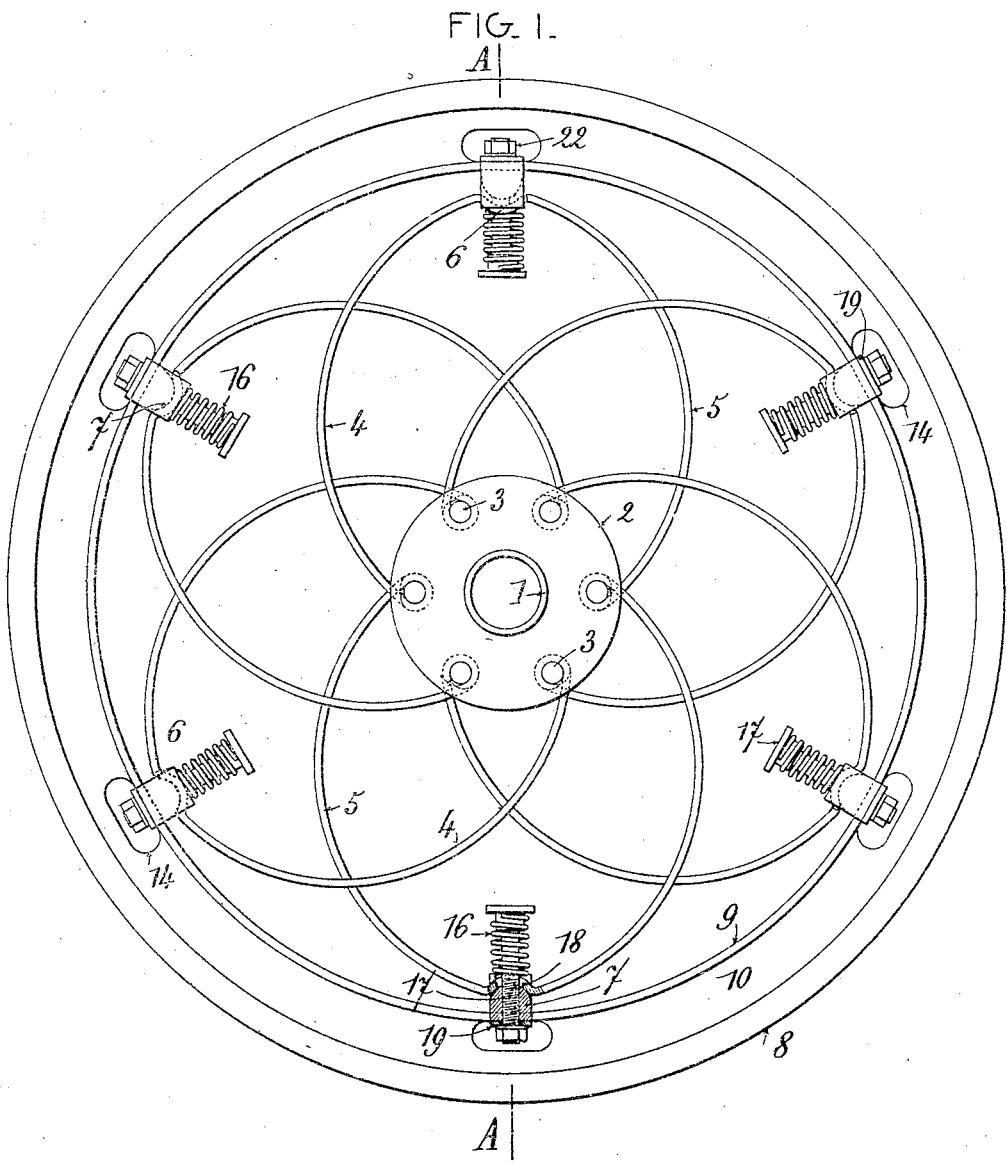

No. 786,657. PATENTED APR. 4, 1905.
L. MARCHAND.
YIELDING SPRING WHEEL.
APPLICATION FILED SEPT. 28, 1904.

2 SHEETS—SHEET 1.

WITNESSES:

INVENTOR

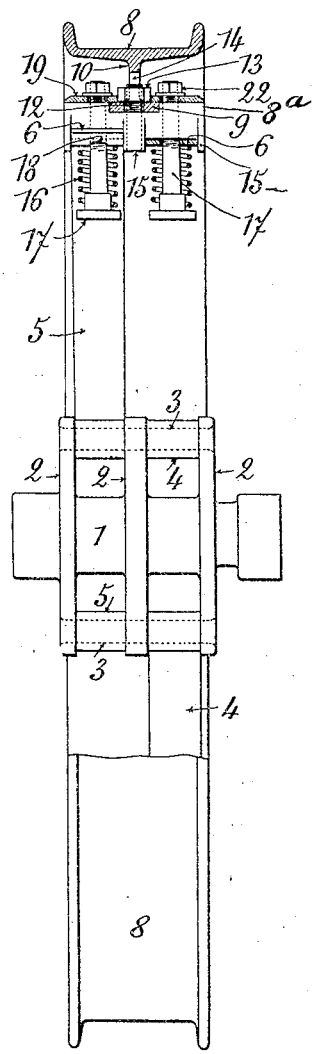
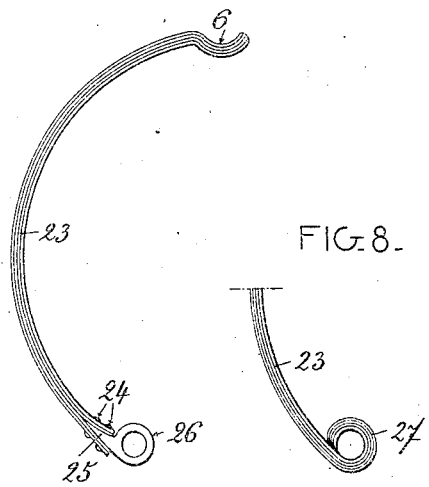
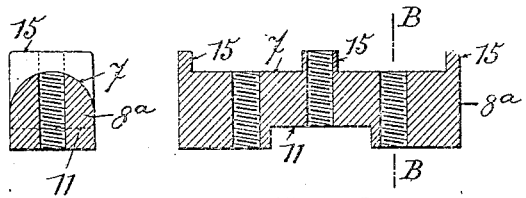
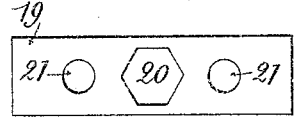

No. 786,657.

Patented April 4, 1905.

UNITED STATES PATENT OFFICE.

LOUIS MARCHAND, OF ROUBAIX, FRANCE.

YIELDING SPRING-WHEEL.

SPECIFICATION forming part of Letters Patent No. 786,657, dated April 4, 1905.

Application filed September 28, 1904. Serial No. 226,300.

*To all whom it may concern:*

Be it known that I, LOUIS MARCHAND, machinist, a citizen of the Republic of France, residing at 28 Rue du Fresnoy, Roubaix, departement du Nord, in the Republic of France, have invented certain new and useful Improvements in Yielding Spring-Wheels, of which the following is a specification.

This invention relates to a wheel having yielding curved spokes. In the said wheel each of the yielding spokes is jointed at one of its ends on the hub, while its opposite end is movable and guided with respect to the tire in a radial direction. This arrangement prevents the spoke from giving way alternately in two contrary directions, which often causes the breaking up of the wheels having yielding spokes as constructed heretofore.

The accompanying drawings show by way of example one way in which the present invention may be carried out.

Figure 1 is an elevation of the wheel. Fig. 2 is a sectional view on the line A A of Fig. 1. Fig. 3 is a longitudinal section of one of the braces. Fig. 4 is a cross-section on the line B B of Fig. 3. Fig. 5 is a plan view of one of the braces. Fig. 6 is a plan view of a locking-plate. Figs. 7 and 8 show modified forms of the springs.

The hub 1 of the wheel shown is provided with three cheeks 2, between which are fixed six stays 3. On each of the said stays are jointed the bent ends of two yielding spokes 4 and 5. The said spokes are arc-shaped, the arcs being formed in contrary directions. The spokes are flat in cross-section and their curve lies in a plane which is perpendicular to the axis of the hub. The six spokes 4, curved in the same direction, are placed in one and the same plane on one side of the wheel, and the six others are placed in a plane which is parallel to the one just mentioned, on the other side of the wheel.

The outer end of each spoke 4 or 5 is curved inwardly, as shown at 6, so as to bear on a cylindrical part 7 of a brace $8^a$, fixed to the tire of the wheel. The said tire comprises two concentric flat circles 8 and 9, connected together by an annular rib 10. The outer circle 8 is intended to accommodate a solid, hollow, or pneumatic rubber rim, and the narrower inner circle 9 bears on the braces. Each of the said braces is provided with a recess 11, in which the circle 9 fits snugly and is fixed in place by means of a screw 12, the nut 13 of which is housed in a recess 14 of the rib 10. The brace also comprises on its inner side projections 15, having faces parallel to the plane of the wheel in order to guide the ends 6 of the spokes 4 and 5. The said ends are pressed against the parts 7 by the spiral springs 16 bearing on the heads of the guides 17, which are fixed radially in the braces and are free to pass through the elongated openings 18 of the ends 6.

19 designates plates in each of which is a polygonal opening 20, (see Fig. 6,) which fits the nut 13, and two circular holes 21 for the passage of the guides 17. The plates 19, fixed by the nuts 22 of the guides 17, prevent the nuts 13 from becoming loose. In case the screw 12 should be broken, the brace would still be held on the circle 8, because the nuts 22 clamp the brace and the plate 19 one against the other and against the circle 8, located between them. The parts are thus rendered quite safe.

When the wheel is not loaded, the ends 6 of the spokes 4 5 are all applied against the braces. When a heavy load or a more or less violent shock acts on the axle, the lower spokes bulge out to a certain extent, while the upper spokes collapse correspondingly, whereupon the springs 16 yield under the action of the upper spokes and allow the latter to move away from the corresponding braces, as will be easily understood by referring to the upper part of Fig. 1. The spokes are thus prevented from yielding to a detrimental or dangerous extent, and as the bulge is the only prejudicial yield they will last a long time, even when the wheel is subjected to very heavy shocks.

The spokes are very stable on account of their being as wide at the hub as they are at the tire. Their rigidity is further increased by the fact that they have a flat curve in keeping with the axis of the wheel and that they are guided at one end by the projections 15 and at the other end by the cheeks 2. The said projections have the further effect of holding the spokes in place when they come against the curbstone of the pavement or any other lateral obstacle. This sort of accident is, moreover, avoided to a great extent on account of the ends of the braces, which extend somewhat beyond the outer plane of the spokes. (See Fig. 2.)

For the purpose of protecting the springs against rust and breakage through the introduction of grit they may be inclosed in very supple rubber sleeves. (Not shown.)

The yielding spokes may be made up of two or more juxtaposed metal strips, as shown in Figs. 7 and 8.

In Fig. 7, 23 designates several metal strips juxtaposed, arc-shaped or of other similar form and having their outer end bent, as shown at 6, to bear against a brace of the tire, while their inner end is fixed to the hub by means of rivets 24 or bolts on the lug 25 of a socket 26, intended to be mounted on a stay or brace 3 of the hub of the wheel.

The form shown in Fig. 8 differs from the previous one in that the inner end of the spring formed by the metal strips 23 is bent into the shape of an eyelet 27 to be jointed directly on the brace or stay 3 of the hub.

The spokes also may be made up of several metal strips of decreasing length fixed one on another in the same manner as the suspension-springs usually used for carriages, &c.

I claim—

1. A wheel comprising a tire, a hub, curved yielding spokes of which the inner end is attached to the hub, and relatively fixed means for guiding the outer end of the spokes radially with respect to the tire to permit them to yield bodily toward and from said tire.

2. A wheel comprising a tire, a hub, yielding spokes curved in one direction and placed in the same plane, and yielding spokes curved in the opposite direction and placed in a plane parallel to the first-mentioned plane, the inner ends of the said spokes being attached to the hub, and relatively fixed means for guiding the outer end of the spokes radially with respect to the tire to permit them to yield bodily toward and from said tire.

3. A wheel comprising a tire, braces fixed across the tire, guides fixed on the ends of each brace, a hub, curved yielding spokes, one end of each spoke being jointed on the hub and the other end having a slot and being engaged on a guide, and springs on the guides and acting on the spokes.

4. A wheel comprising a tire, braces fixed across the tire, projections on the braces, a hub having parallel cheeks, and curved yielding spokes the ends of which are slidably engaged between the cheeks of the hub and the projections of the braces.

5. In a wheel, the combination with a tire comprising two concentric rings, of an intermediate rib having recesses, braces each having a slot adapted to fit on the inner ring, screws inclosed in said braces, nuts situated within the recesses of the rib, locking-plates engaging the nuts, guides fixed on the braces, nuts screwed upon the guides and clamping the locking-plates, and yieldable spokes co-acting with the braces.

6. A wheel comprising a tire, a hub, curved spokes yieldable radially of the wheel having their inner ends attached to the hub, and means for mounting the outer ends of the spokes to slide toward and from the tire as the spokes bend.

7. A wheel comprising a tire, a hub, curved spokes yieldable radially of the wheel having their inner ends attached to the hub, means for mounting the outer ends of the spokes to slide toward and from the tire as the spokes bend, and springs acting upon said spokes at their outer ends.

8. A wheel comprising a tire, a hub, yielding spokes having their inner ends attached to the hub, and guides extending through the spokes and along which they may move.

9. A wheel comprising a tire, a hub, yielding spokes having their inner ends attached to the hub, guides extending through the spokes and along which they may move, and springs interposed between the guides and spokes.

10. A wheel comprising a tire, a hub, yielding spokes having their inner ends attached to the hub, guides extending through the spokes and along which they may move, and springs surrounding the guides and contacting with the spokes.

11. A wheel comprising a tire, a hub, curved spokes yieldable radially of the wheel having their inner ends attached to the hub, and guides along which the outer ends of the spokes may move.

12. A wheel comprising a tire, a hub, curved spokes yieldable radially of the wheel having their inner ends attached to the hub, guides along which the outer ends of the spokes may move, and springs resisting the inward movement of the spokes.

In testimony that I claim the foregoing as my invention I have signed my name in presence of two subscribing witnesses.

LOUIS MARCHAND.

Witnesses:
C. H. ATLEE,
S. CHIO.